United States Patent
Koo

(10) Patent No.: US 8,593,089 B2
(45) Date of Patent: Nov. 26, 2013

(54) MOTOR DRIVING APPARATUS AND METHOD

(75) Inventor: Bon Young Koo, Gyunggi-do (KR)

(73) Assignee: Samsung Electro-Mechanics Co., Ltd., Suwon (KR)

(*) Notice: Subject to any disclaimer, the term of this patent is extended or adjusted under 35 U.S.C. 154(b) by 2 days.

(21) Appl. No.: 13/421,490

(22) Filed: Mar. 15, 2012

(65) Prior Publication Data

US 2013/0162184 A1 Jun. 27, 2013

(30) Foreign Application Priority Data

Dec. 21, 2011 (KR) .................. 10-2011-0139060

(51) Int. Cl.
 *H02P 6/16* (2006.01)
(52) U.S. Cl.
 USPC .................................... 318/400.04
(58) Field of Classification Search
 None
 See application file for complete search history.

(56) References Cited

U.S. PATENT DOCUMENTS

| | | | |
|---|---|---|---|
| 8,305,017 B2* | 11/2012 | Fukushima | 318/375 |
| 2005/0275362 A1* | 12/2005 | Yamamoto et al. | 318/254 |
| 2007/0075664 A1* | 4/2007 | Muroi | 318/270 |
| 2011/0248658 A1* | 10/2011 | O'Gorman et al. | 318/400.32 |

FOREIGN PATENT DOCUMENTS

| | | |
|---|---|---|
| JP | 2001-263256 A | 9/2001 |
| JP | 3500328 B2 | 5/2003 |
| KR | 10-2005-0082607 A | 8/2005 |

OTHER PUBLICATIONS

Japanese Office Action issued in Japanese Application No. 2012-063734 dated Augsut 27, 2013 with English Translation.

* cited by examiner

*Primary Examiner* — Lincoln Donovan
*Assistant Examiner* — Zoheb Imtiaz
(74) *Attorney, Agent, or Firm* — McDermott Will & Emery LLP

(57) ABSTRACT

There are provided a motor driving apparatus and method. The motor driving apparatus includes: a speed detecting unit detecting a rotation speed of a motor according to an edge of a hall signal, and counting a preset clock signal while allocating a weighted value thereto according to a preset reference count value at the time of counting the clock signal based on the detected speed; a position calculating unit calculating a rotation position of the motor according to a count value of the speed detecting unit; and a driving unit driving the motor according to position information of the motor calculated by the position calculating unit.

7 Claims, 8 Drawing Sheets

10

MOTOR DRIVING APPARATUS AND METHOD

CROSS-REFERENCE TO RELATED APPLICATIONS

This application claims the priority of Korean Patent Application No. 10-2011-0139060 filed on Dec. 21, 2011, in the Korean Intellectual Property Office, the disclosure of which is incorporated herein by reference.

BACKGROUND OF THE INVENTION

1. Field of the Invention

The present invention relates to a motor driving apparatus and a method of controlling the driving of a motor by accurately detecting a rotation position of the motor.

2. Description of the Related Art

A brushless direct current (BLDC) motor generally refers to a DC motor changing a function of conducting current or adjusting a current direction using a non-contact position detector and a semiconductor element rather than using a mechanical contact such as a brush, a commutator, and the like, in a DC motor according to the related art.

In order to drive this BLDC motor, a driving apparatus may be used.

FIG. 1 is a configuration diagram of a general motor driving apparatus.

Referring to FIG. 1, a general motor driving apparatus 10 may include a controlling unit 11 and a driving unit 12.

The controlling unit 11 may control driving of the motor, and the driving unit 12 may drive the motor by turning four field effect transistors (FETs) on or off in response to a driving signal of the controlling unit 11.

FIG. 2 is a diagram showing driving signals of the motor driving apparatus.

Referring to FIG. 2, the driving signals transferred from the controlling unit 11 to the driving unit 12 may be divided into four kinds of signals, and be transferred in a sequence of identification numerals ①, ②, ③ and ④.

That is, a first PMOS FET P1 and a second NMOS FET N2 may be turned on by a driving signal represented by identification numeral ①, and the first PMOS FET P1 and the second NMOS FET N2 may be turned off and a second PMOS FET P2 and a first NMOS FET N1 may be turned on by a driving signal represented by identification numeral ②.

Again, the second PMOS FET P2 and the first NMOS FET N1 may be turned off and the first PMOS FET P1 and the second NMOS FET N2 may be turned on by a driving signal represented by identification numeral ③, and the first PMOS FET P1 and the second NMOS FET N2 may be turned off and the second PMOS FET P2 and the first NMOS FET N1 may be turned on by a driving signal represented by identification numeral ④.

As described above, the cases in which the first PMOS FET P1 and the second NMOS FET N2 are turned on and the second PMOS FET P2 and the first NMOS FET N1 are turned on are repeated, to change a direction of current flowing in the motor, whereby the motor may rotate.

In this driving scheme, when the first PMOS FET P1 or the second PMOS FET P2 is turned on, a pulse width modulation (PWM) signal (oblique line portions of FIG. 2) is generated, whereby a speed of the motor may be controlled.

However, as disclosed in the Related Art Document, Korean Patent Laid-Open Publication No. 10-2005-0082607, the motor driving apparatus according to the related art may not accurately detect a rotation position of the motor, such that it maybe difficult to accurately control the motor. Further, in order to accurately control the rotation position of the motor, a number of hall sensors are required, such that manufacturing costs are increased.

SUMMARY OF THE INVENTION

An aspect of the present invention provides a motor driving apparatus capable of driving a motor by allocating a weighted value to a count value according to a current speed of the motor according to a preset reference count value to accurately detect a current position of the motor.

According to an aspect of the present invention, there is provided a motor driving apparatus including: a speed detecting unit detecting a rotation speed of a motor according to an edge of a hall signal, and counting a preset clock signal while allocating a weighted value thereto according to a preset reference count value at the time of counting the clock signal based on the detected speed; a position calculating unit calculating a rotation position of the motor according to a count value of the speed detecting unit; and a driving unit driving the motor according to position information of the motor calculated by the position calculating unit.

The speed detecting unit may include: an edge detector detecting an edge of the hall sensor; a revolutions per minute (RPM) detector detecting the rotation speed of the motor according to a value detected by the edge detector; a counter allocating the weighted value to a count value of the clock signal according to the rotation speed detected by the RPM detector based on the reference count value; and a clock signal provider providing the clock signal.

The counter may count the clock signal at a preset motor speed to set the reference count value.

According to another aspect of the present invention, there is provided a motor driving method including: detecting a rotation speed of a motor according to an edge of a hall signal; counting a clock signal while setting a weighted value for a preset clock signal based on the detected speed; calculating a rotation position of the motor according to a count value; and driving the motor according to calculated motor position information.

The counting may include allocating weighted value to the counted clock signal according to the detected rotation speed based on a preset reference count value.

The counting may include counting the clock signal at a preset motor speed to set the reference count value.

The counting may include confirming a previous position of the motor and counting a clock signal at a motor speed at the previous position to set the reference count value.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
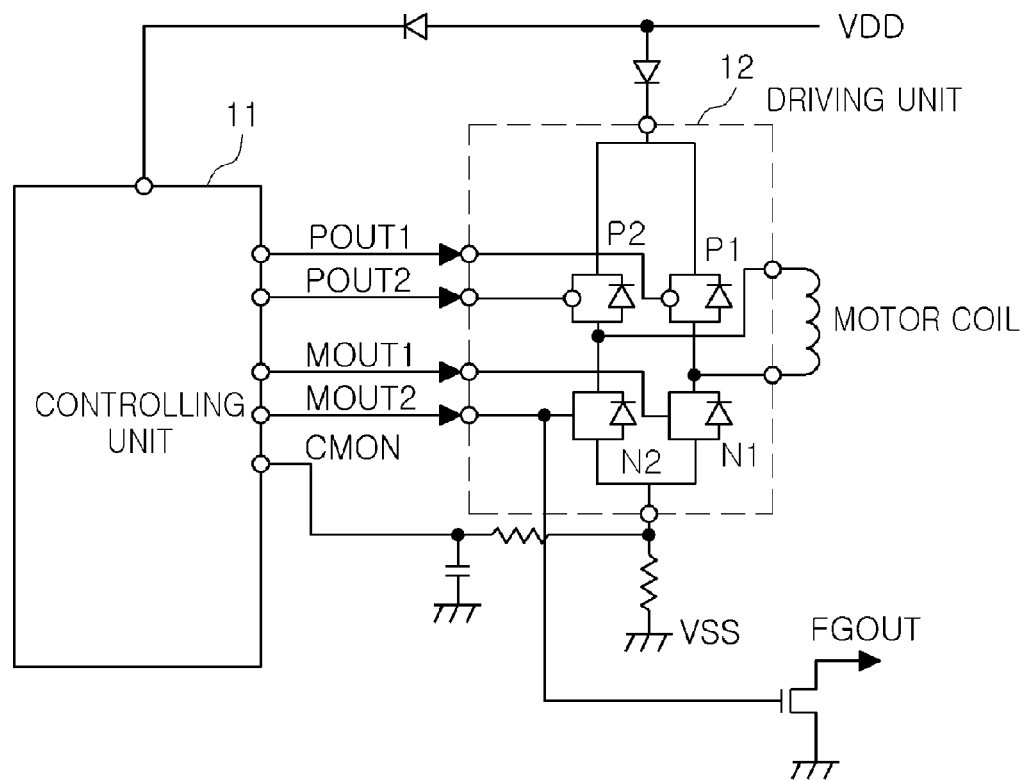
FIG. 1 is a block diagram of a general motor driving apparatus.

Hereinafter, embodiments will be described in detail with reference to the accompanying drawings so that they can be easily practiced by those skilled in the art to which the present invention pertains.

However, in describing embodiments of the present invention, detailed descriptions of well-known functions or constructions will be omitted so as not to obscure the gist of the present invention.

In addition, like or similar reference numerals denote parts performing similar functions and actions throughout the drawings.

A case in which anyone part is connected with the other part includes a case in which the parts are directly connected with each other and a case in which the parts are indirectly connected with each other with other elements interposed therebetween.

In addition, unless explicitly described otherwise, "comprising" any components will be understood to imply the inclusion of other components but not the exclusion of any other components.

Embodiments of the present invention will now be described in detail with reference to the accompanying drawings.

Figure 3:
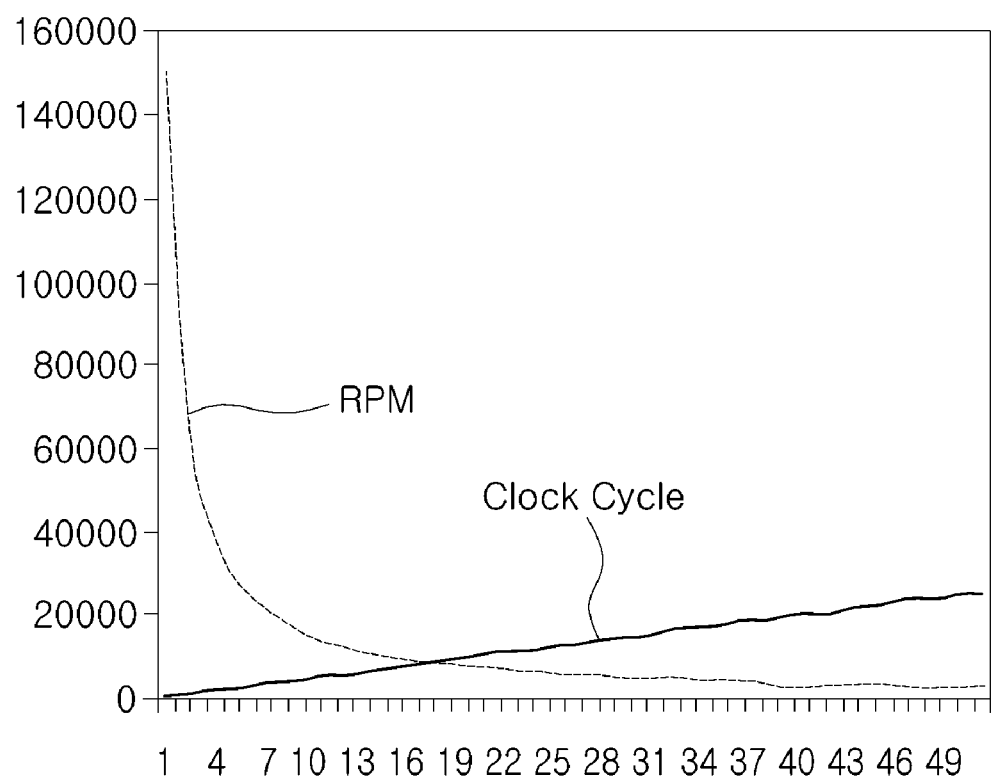
FIG. 3 is a graph showing a relationship between a motor speed and a clock signal.

FIG. 3 is a graph showing a relationship between a motor speed and a clock signal.

It may be appreciated from FIG. 3 that the motor speed and the clock signal are in inverse proportion to each other.

Figure 2:
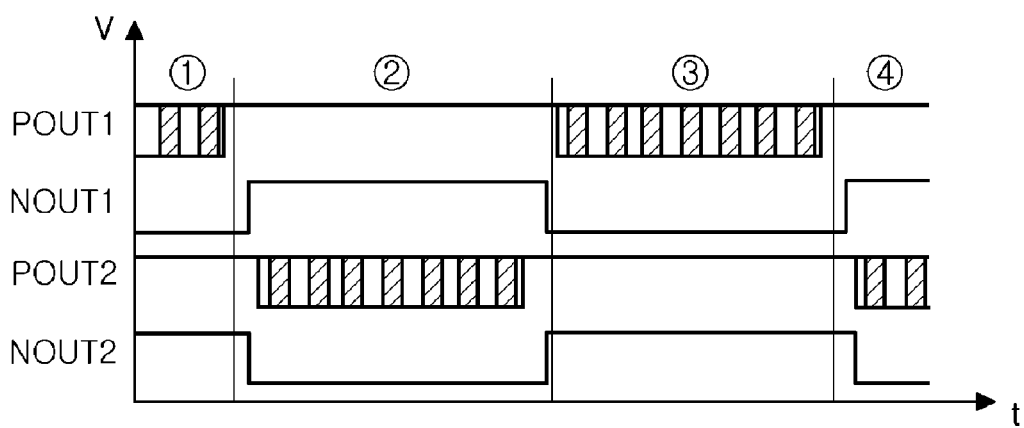
FIG. 2 is a graph showing a motor driving signal referred to in FIG. 1.

That is, as shown in FIG. 2, a length of a turn-on period of a driving signal for driving a motor may be changed according to a rotation speed of the motor. That is, when a revolutions per minute (RPM), a speed of the motor, increases, the length of the turn-on period may be relatively reduced. Here, since the length of the turn-on period is based on how many clock signals are present in the period, as the speed (RPM) of the motor increases, the number of clock signals in the turn-on period may be reduced, as shown in FIG. 3.

For example, when one rotation of the motor is regarded as 100%, in the case of attempting to turn a driving field effect transistor (FET) on at a position of 10% thereof, it is required to recognize the 10% position of the motor. However, an accurate rotation position of the motor may not be recognized only with simple count of the clock signal.

To this end, a motor driving apparatus according to an embodiment of the present invention is provided below.

Figure 4:
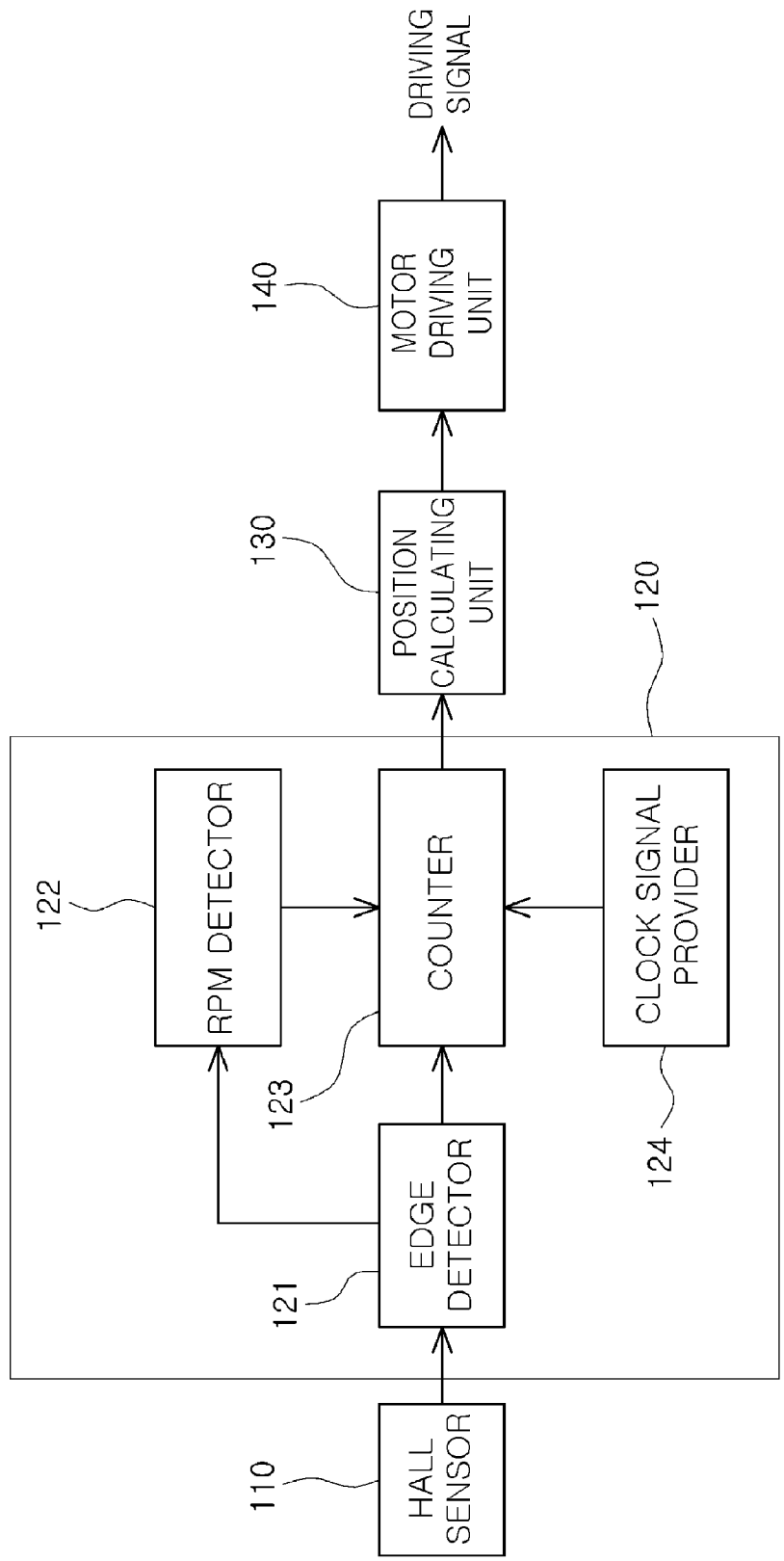
FIG. 4 is a schematic block diagram of a motor driving apparatus according to an embodiment of the present invention.

FIG. 4 is a schematic block diagram of a motor driving apparatus according to an embodiment of the present invention.

Referring to FIG. 4, the motor driving apparatus 100 according to the embodiment of the present invention may include a speed detecting unit 120, a position calculating unit 130, and a driving unit 140.

The speed detecting unit 120 may receive a hall signal from a hall sensor 110, detect a speed of the motor by detecting an edge of the hall signal, and allocate a weighted value based a preset reference count value to a count value of a clock signal at this time.

To this end, the speed detecting unit 120 may include an edge detector 121, an RPM detector 122, a counter 123, and a clock signal provider 124.

The edge detector 121 may detect an edge of the hall signal from the hall sensor 110.

The RPM detector 122 may detect the speed of the motor according to the edge of the hall signal detected from the edge detector 121.

Figure 5:
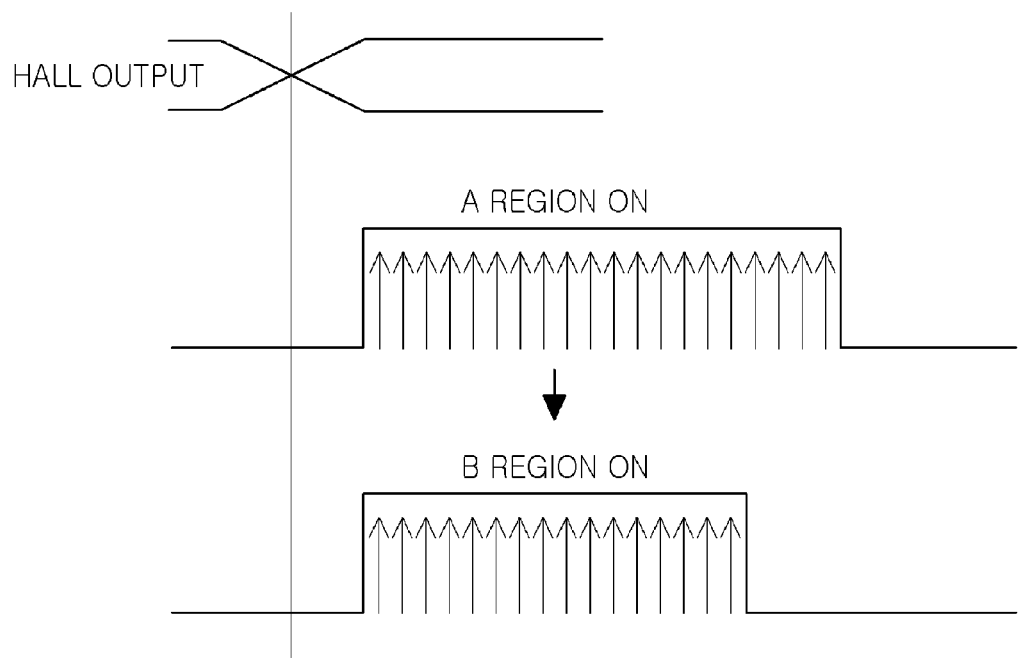
FIG. 5 is a graph showing a clock signal in a turn-on period according to an embodiment of the present invention.

The counter 123 may count the pulse number of the clock signal in the turn-on period of the driving signal for driving the motor according to the RPM of the motor, which is the speed of the motor detected by the RPM detector 122. FIG. 5 is a graph showing a clock signal in a turn-on period according to an embodiment of the present invention. Referring to FIG. 5, the pulse number of the clock signal in the turn-on period of the driving signal may be changed according to the speed.

Here, the counter 123 may allocate a weighted value to a current count value based on a preset reference count value. The reference count value may be a count value of the pulse number of the clock signal in the RPM of the motor detected previously or a count value of the pulse number of the clock signal when the RPM of the motor is set to '1'.

For example, when a time of a turn-on period of the driving signal is 7000 μs in a case in which the speed of the motor detected previously is 2000 RPM, and when the currently detected speed of the motor is 2500 RPM, a time of a turn-on period of the driving signal maybe 6000 μs. At this time, when a frequency of the clock signal is 1 MHz, the pulse number of clock signal in 7500 μs maybe 7500 and the pulse number of clock signal in 6000 μs maybe 6000. With regard to 10% of respective positions of the motor, the pulse number of the clock signal may each be 750 and 600.

In a case in which the RPM of the motor increases from 2000 to 2500, that is, by 25%, since the pulse number of clock signal decreases from 750 to 600 (in the case of attempting to detect a position of 10% when the entire rotation of the motor is considered as 100%), when the RPM of the motor is 2500, a weighted value of 1.25 may be allocated to one pulse of the clock signal.

Therefore, when the pulse number of clock signal is 6000, the pulse number of clock signal, 7500, according to a preset weighted value may be regarded as a 100% position thereof. Accordingly, for example, the position calculating unit 130 may calculate a position when the pulse number is 600 in order to calculate a 10% position thereof, whereby an accurate 10% position may be recognized. The driving unit 140 may provide a corresponding driving signal to the motor according to the position calculated by the position calculating unit 130, thereby driving the motor.

As another example, when a count value in the case in which the RPM is '1' is set to a reference count value, the pulse number when the clock signal has the frequency of 1 MHz may be 15000000. A case in which the pulse number is 15000000 may be regarded as a 100% position. Therefore, in a case in which the detected RPM of the motor is 1000 RPM, a weighted value may be set to 1000 times, such that a case in which the counted pulse number is 15000 may be regarded as a 100% position.

A method of setting a weighted value as described above and a method of calculating a motor position through the setting of the weighted value may be various, which will be described with reference to the accompanying drawings.

Figure 6:
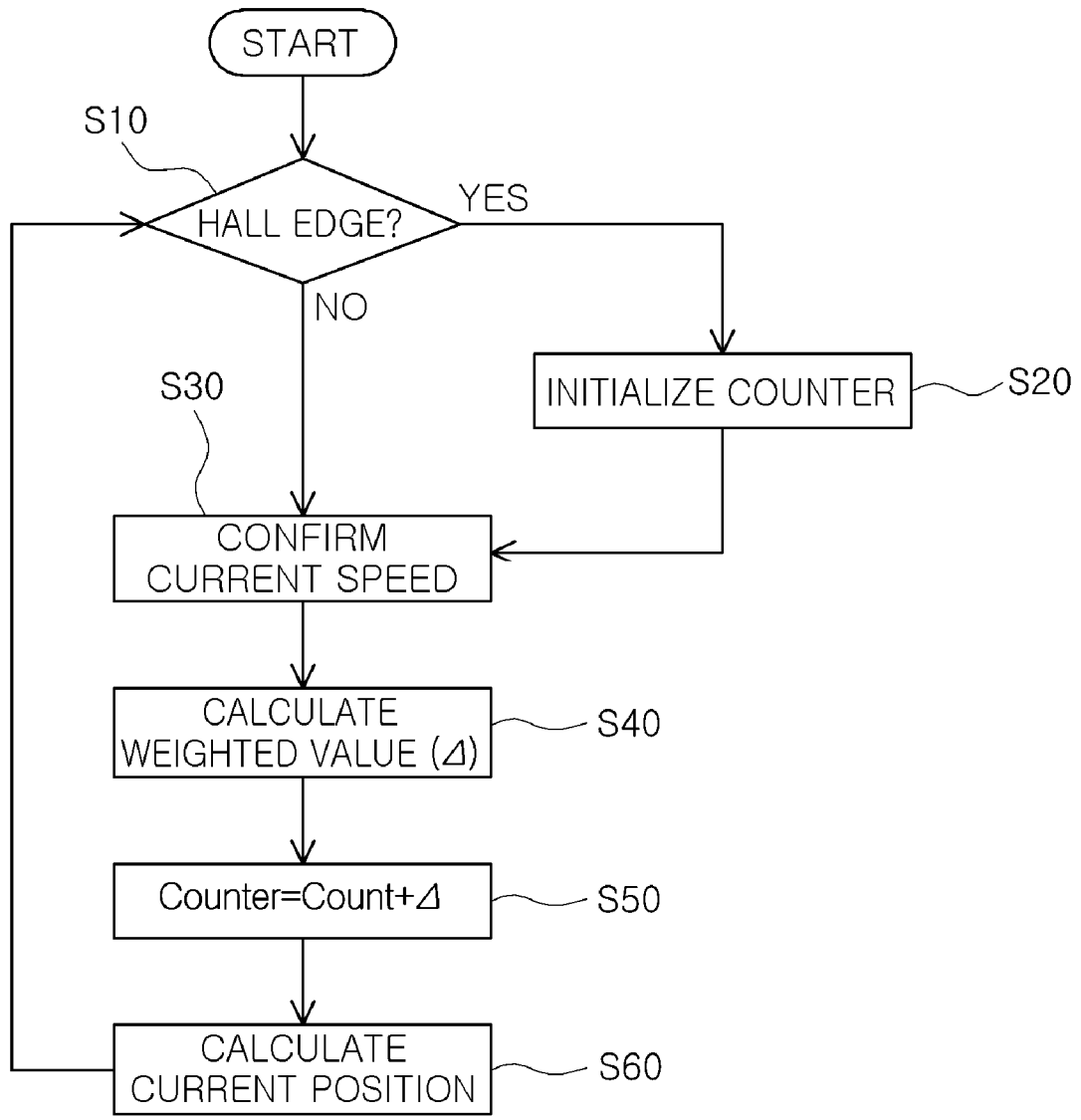
FIG. 6 is a flow chart of a motor driving method according to an embodiment of the present invention.

FIG. 6 is a flow chart of a motor driving method according to an embodiment of the present invention.

Referring to FIG. 6, in the motor driving method according to the embodiment of the present invention, a hall edge may be detected (S10), a counter may be initialized (S20), and a speed of a motor may be detected (S30). Then, a weighted value may be calculated (S40), and the weighted value may be allocated to a count value (S50), and a current position may be calculated (S60).

Figure 7:
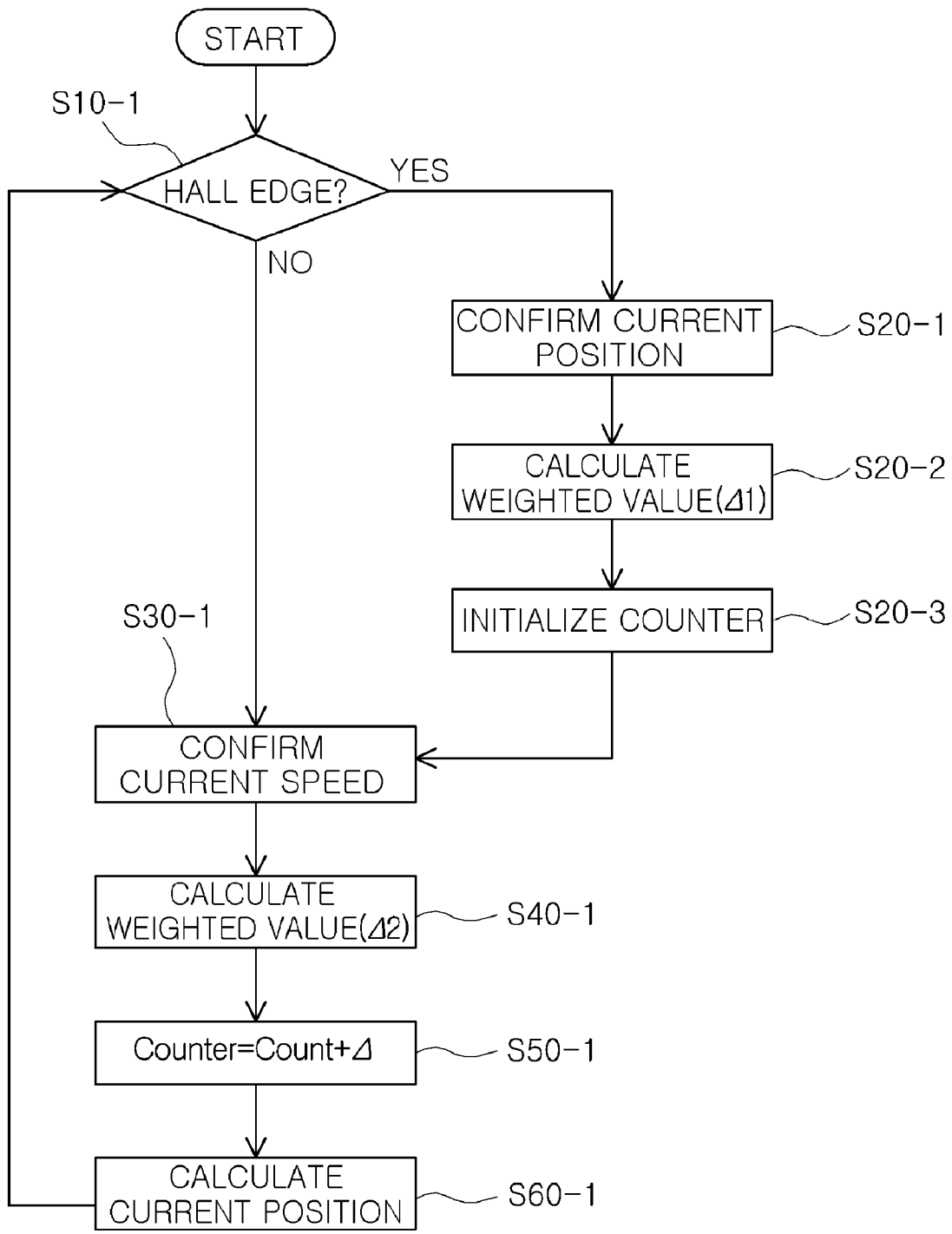
FIG. 7 is a flowchart of a motor driving method according to another embodiment of the present invention.

FIG. 7 is a flow chart showing a motor driving method according to another embodiment of the present invention.

Referring to FIG. 7, in the motor driving method according to another embodiment of the present invention, a hall edge may be first detected (S10-1), a current position of a motor may be confirmed in order to confirm whether a polarity of a hall sensor is changed (S20-1), a weighted value may be set according to the confirmed current position of the motor (S20-2), and a counter may be initialized (S20-3), and a current speed of the motor may be detected (S30-1). Then, a weighted value may be again calculated (S40-1), and the weighted value may be allocated to the count value (S50-1), and a current position may be calculated (S60-1).

Figure 8:
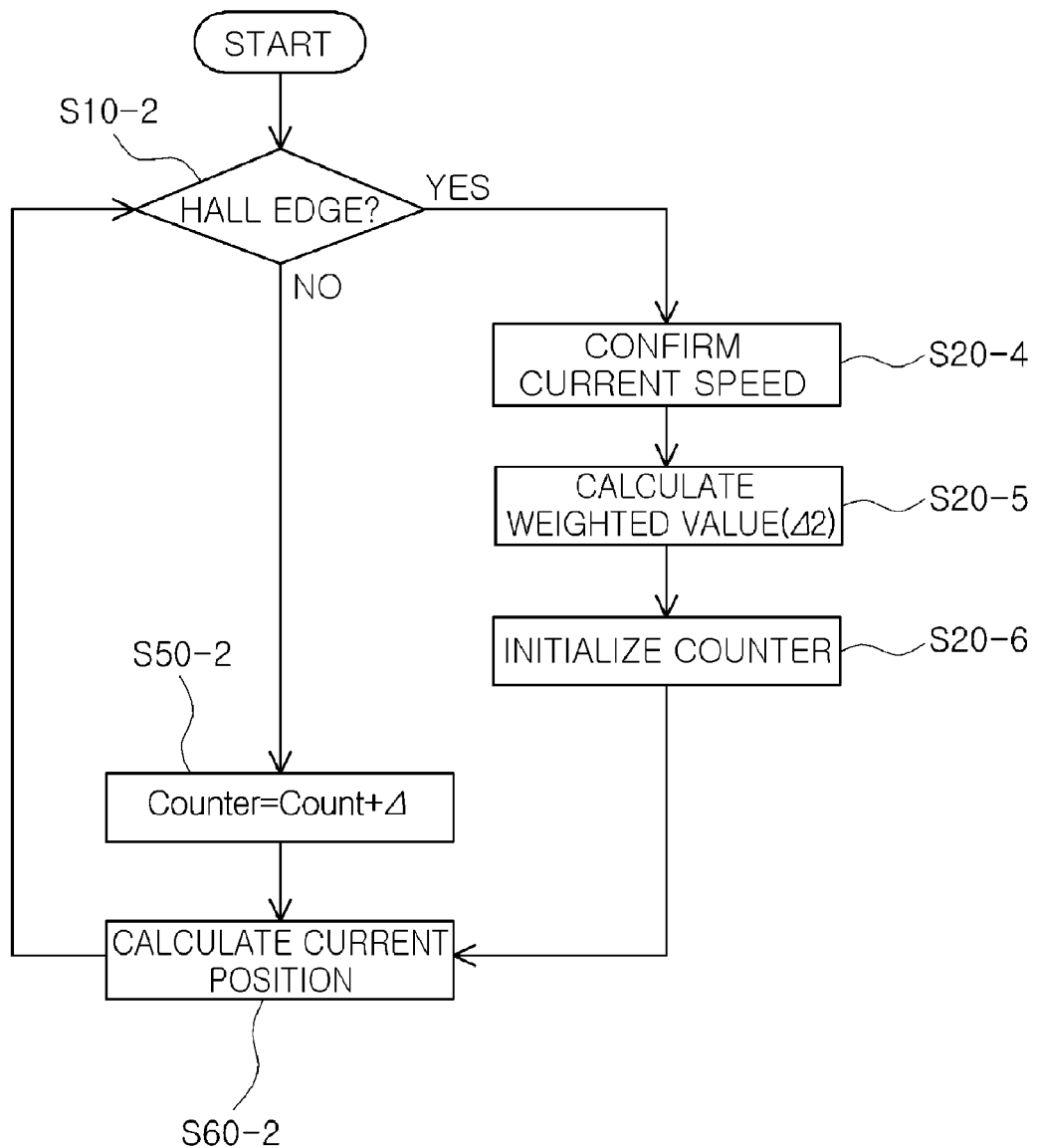
FIG. 8 is a flowchart of a motor driving method according to another embodiment of the present invention.

FIG. 8 is a flow chart of a motor driving method according to another embodiment of the present invention.

In the motor driving method according to another embodiment of the present invention, a hall edge may be first detected (S10-2), a current speed of a motor may be detected (S20-4), a weighted value may be set according to the detected speed of the motor (S20-5), and a counter may be initialized (S20-6), and a current position of the motor may be calculated (S60-2). In a case in which the hall edge is not detected, a preset weighted value maybe allocated to a current count value (S50-2) to calculate a current position of the motor (S60-2).

Figure 9:
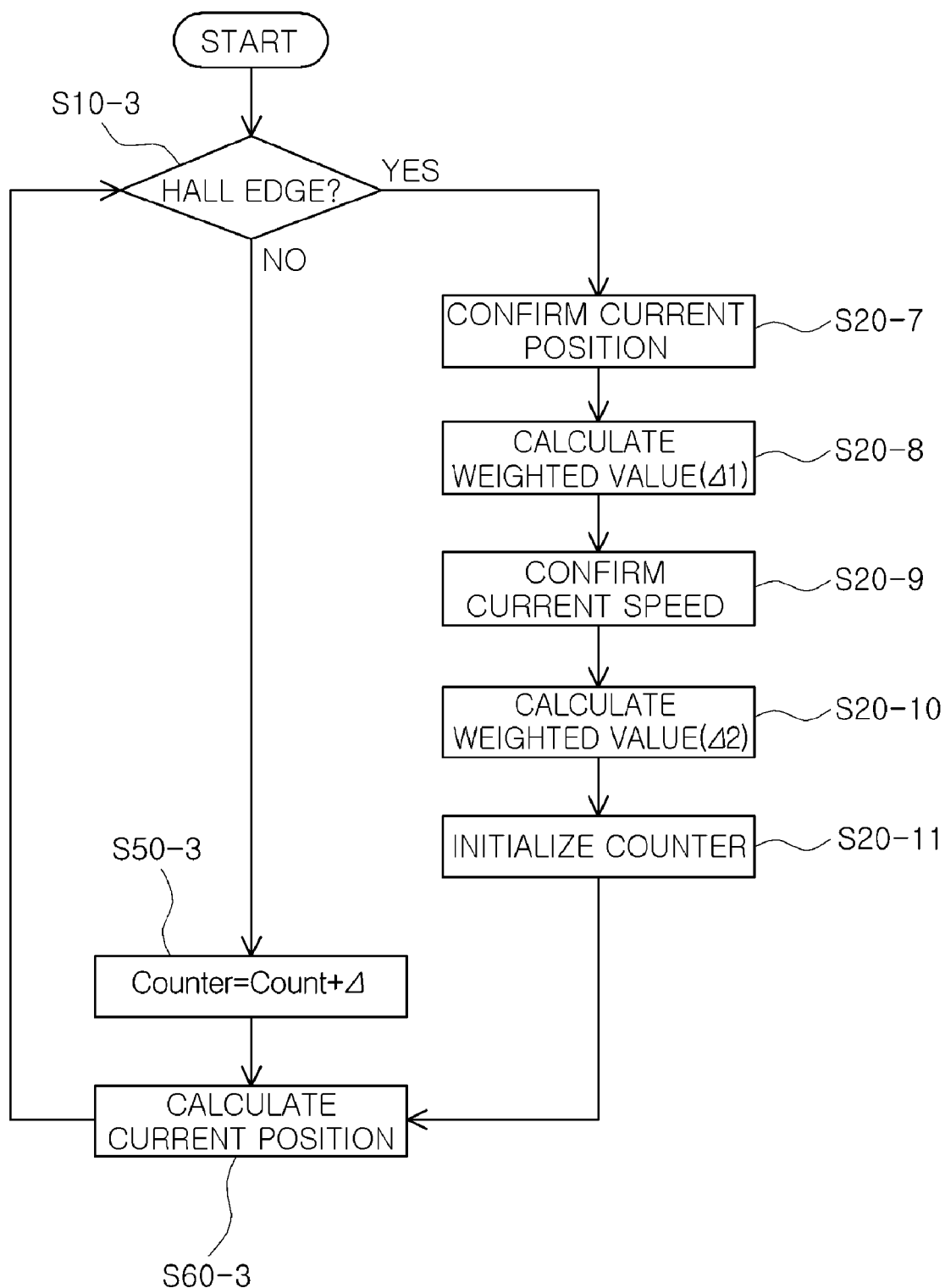
FIG. 9 is a flowchart of a motor driving method according to another embodiment of the present invention.

FIG. 9 is a flow chart showing a motor driving method according to another embodiment of the present invention.

In the motor driving method according to another embodiment of the present invention, a hall edge may be first detected (S10-3), a current position of a motor may be confirmed in order to confirm whether a polarity of a hall sensor is changed (S20-7), a weighted value maybe set according to the confirmed current position of the motor (S20-8), and a current speed of the motor may be detected (S20-9). Then, a weighted value may be again calculated (S20-10), and the count value may be initialized (S20-11), and a current position may be calculated (S60-3). In a case in which the hall edge is not detected, a preset weighted value may be allocated to a current count value (S50-3) to calculate a current position of the motor (S60-3).

As set forth above, according to the embodiments of the present invention, a weighted value may be allocated to a count value based on the current speed of the motor according to a preset reference count value to accurately detect the current position of the motor, whereby the motor may be driven.

While the present invention has been shown and described in connection with the embodiments, it will be apparent to those skilled in the art that modifications and variations can be made without departing from the spirit and scope of the invention as defined by the appended claims.

What is claimed is:

1. A motor driving apparatus comprising:
    a speed detecting unit detecting a rotation speed of a motor according to an edge of a hall signal, and counting a preset clock signal while allocating a weighted value thereto according to a preset reference count value at the time of counting the clock signal based on the detected speed;
    a position calculating unit calculating a rotation position of the motor according to a count value of the speed detecting unit; and
    a driving unit driving the motor according to position information of the motor calculated by the position calculating unit.

2. The motor driving apparatus of claim 1, wherein the speed detecting unit includes:
    an edge detector detecting an edge of the hall sensor;
    a revolutions per minute (RPM) detector detecting the rotation speed of the motor according to a value detected by the edge detector;
    a counter allocating the weighted value to the count value of the clock signal according to the rotation speed detected by the RPM detector based on the reference count value; and
    a clock signal provider providing the clock signal.

3. The motor driving apparatus of claim 2, wherein the counter counts the clock signal at a preset motor speed to set the reference count value.

4. A motor driving method comprising:
    detecting a rotation speed of a motor according to an edge of a hall signal;
    counting a clock signal while setting a weighted value for a preset clock signal, based on the detected speed;
    calculating a rotation position of the motor according to a count value; and
    driving the motor according to calculated motor position information.

5. The motor driving method of claim 4, wherein the counting includes allocating the weighted value to the counted clock signal according to the detected rotation speed, based on a preset reference count value.

6. The motor driving method of claim 5, wherein the counting includes counting the clock signal at a preset motor speed to set the reference count value.

7. The motor driving method of claim 6, wherein the counting includes confirming a previous position of the motor and counting a clock signal at a motor speed at the previous position to set the reference count value.

* * * * *